Aug. 7, 1928.                J. J. N. VAN HAMERSVELD                1,680,074
                        TAPER TURNING ATTACHMENT FOR MACHINE TOOLS
                        Filed July 16, 1926        5 Sheets-Sheet 4
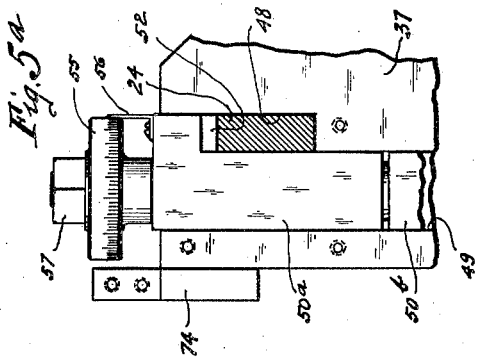
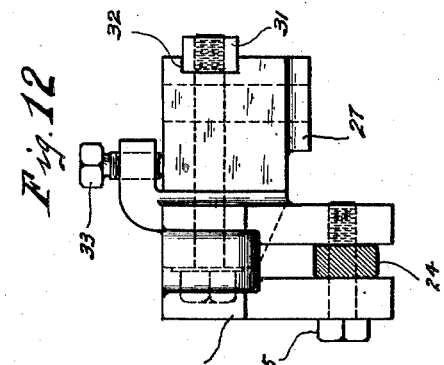
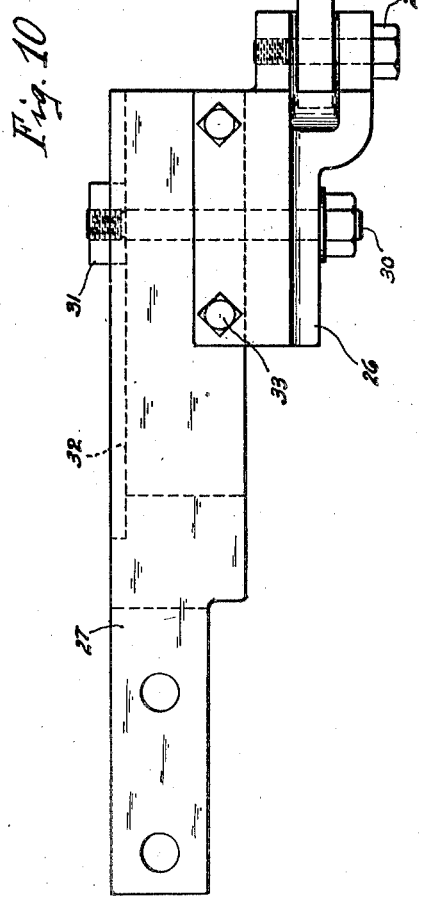
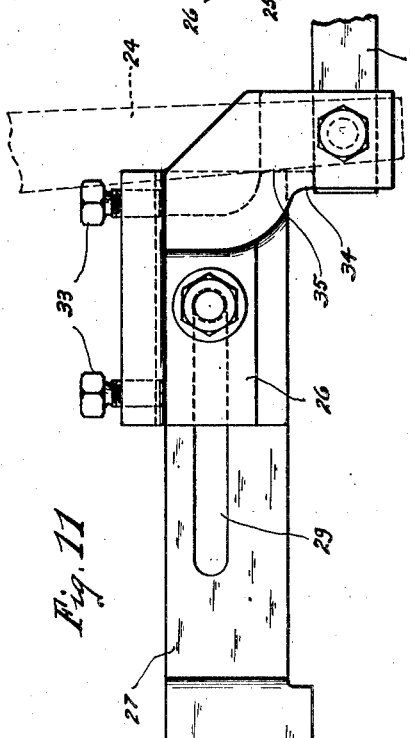
Inventor
John J. N. Van Hamersveld
By Kurz, Hudson & Kent
Attorneys

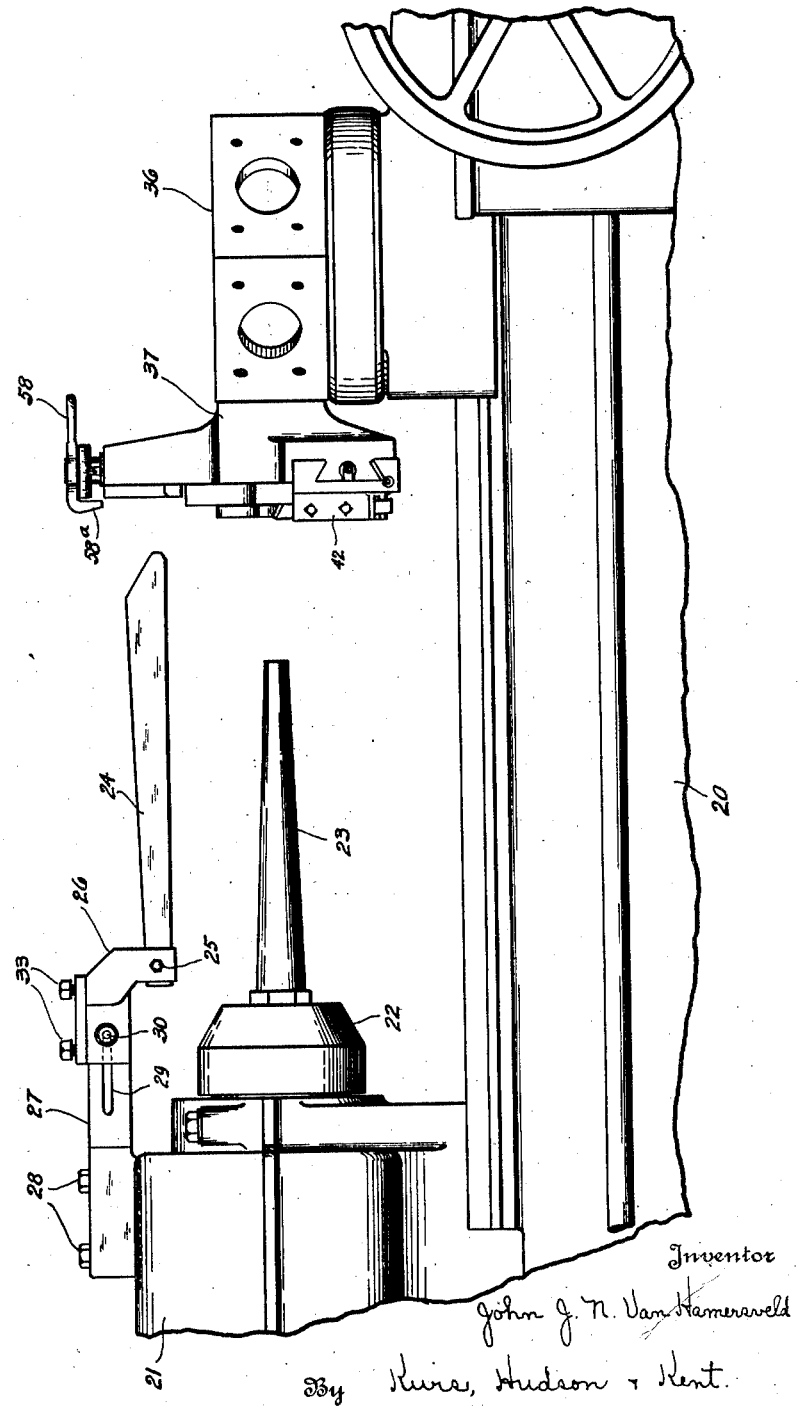

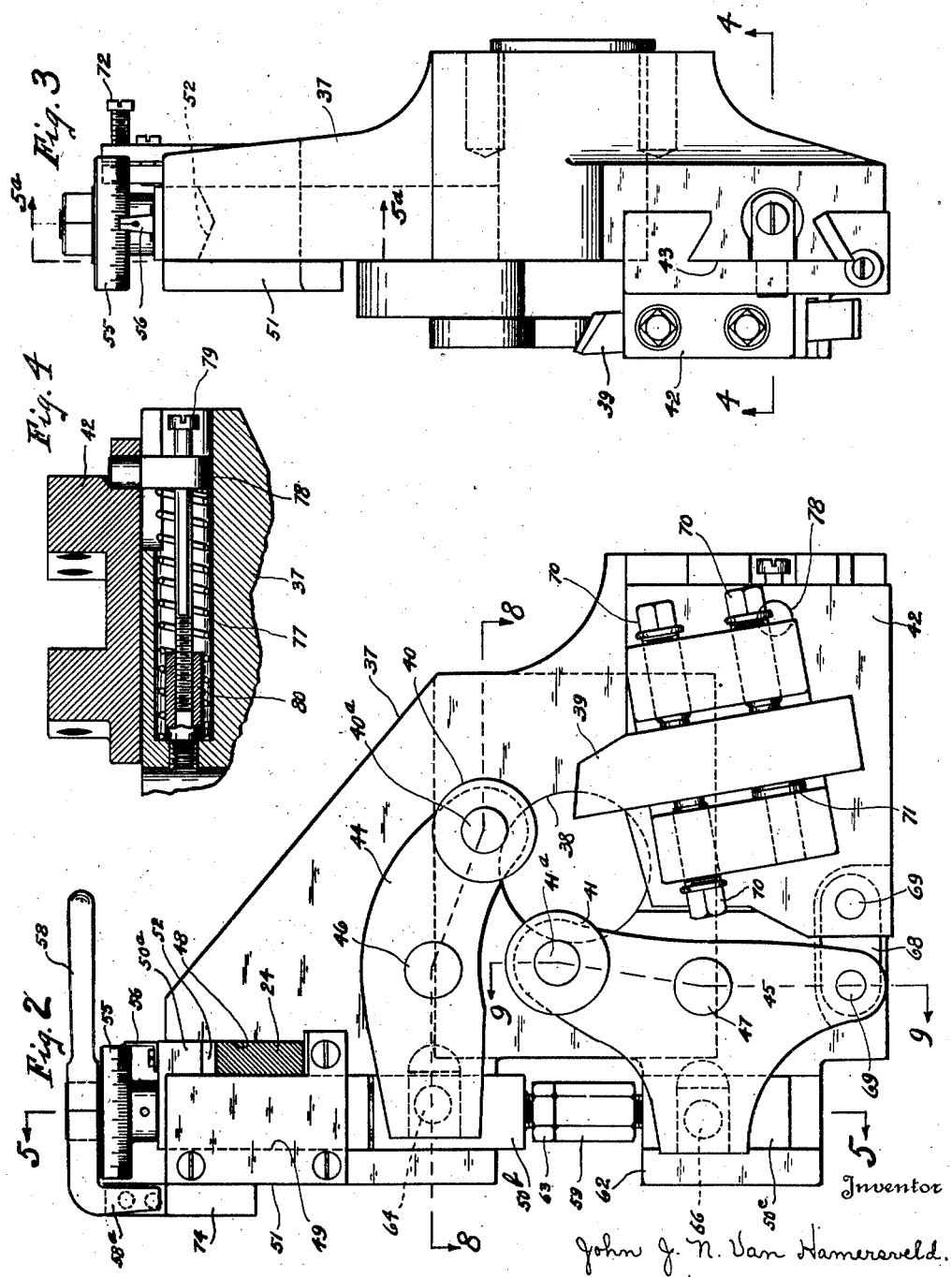

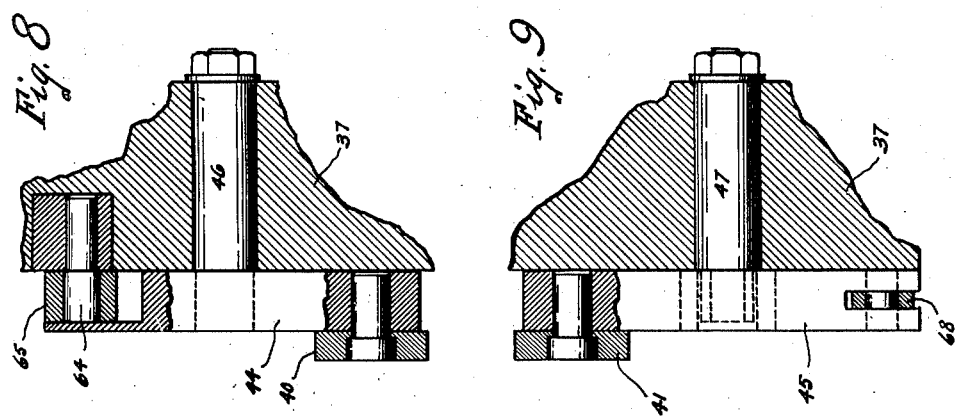
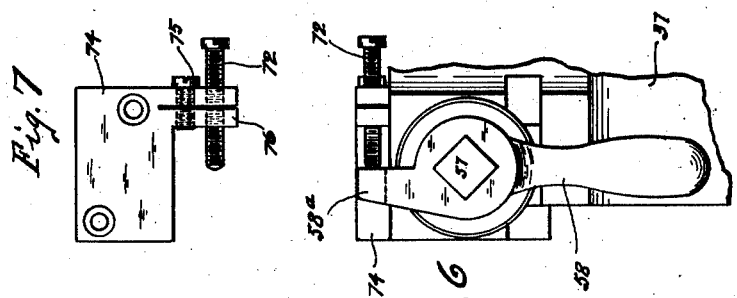
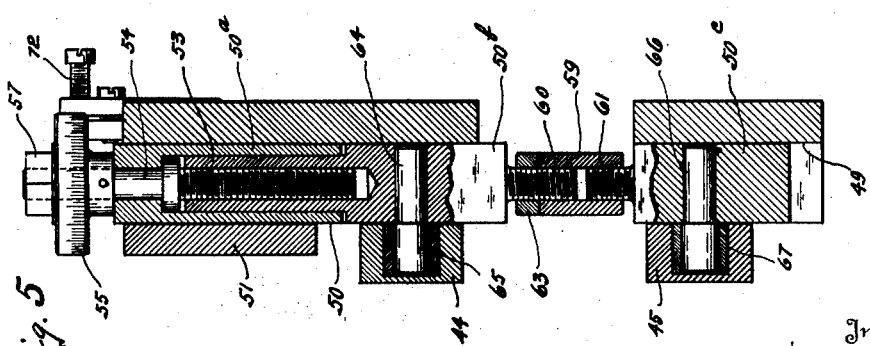

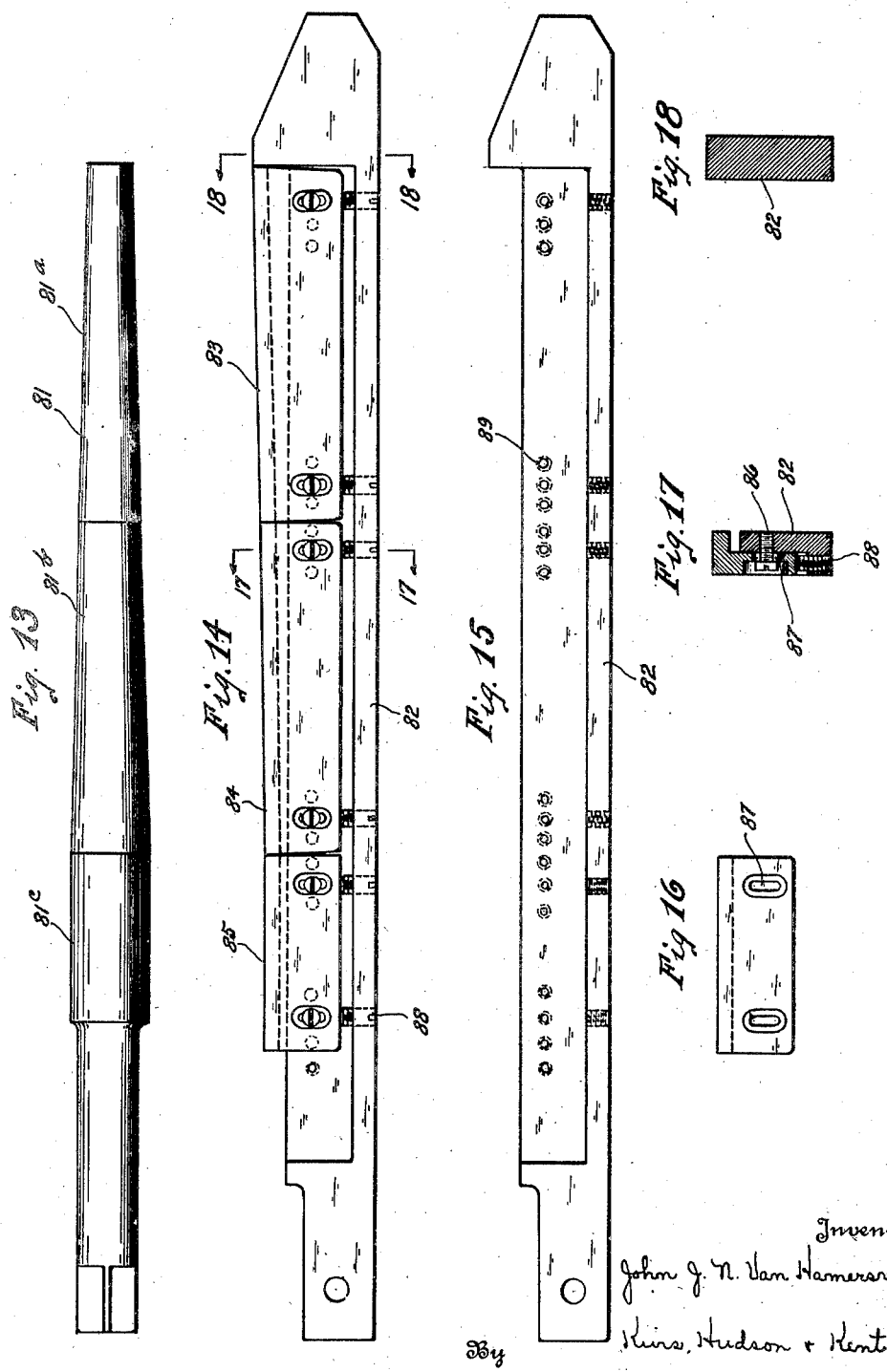

Patented Aug. 7, 1928.

1,680,074

UNITED STATES PATENT OFFICE.

JOHN J. N. VAN HAMERSVELD, OF CLEVELAND HEIGHTS, OHIO, ASSIGNOR TO THE WARNER AND SWASEY COMPANY, OF CLEVELAND, OHIO, A CORPORATION OF OHIO.

TAPER-TURNING ATTACHMENT FOR MACHINE TOOLS.

Application filed July 16, 1926. Serial No. 122,745.

This invention relates to taper turning attachments for machine tools such as lathes, of the general type involving a cam member carried by one of the two relatively movable parts of the machine tool and a follower which is associated with the cutting tool and thrust resisting part or parts carried by another relatively movable part of the machine tool, the follower serving to move the tool and thrust resisting means radially as the cam and follower are moved relatively one lengthwise of the other.

One of the objects of the invention is to provide a taper turning attachment which is direct and positive in its action, accurate, simple, strong and sturdy in construction and inexpensive to construct.

A further object is to provide certain adjustments which readily adapt the attachment for work pieces of different sizes.

A still further object is to arrange the parts so that the cam and follower will not obstruct the operator's view of the work but are preferably arranged both at the rear and above the work leaving a clear and unobstructed space for the tool and for the automatic removal of chips and the like, also to provide certain adjustments in parts which may be manipulated in setting up the attachment or in the course of operation all so arranged that they can be reached conveniently.

A still further object is to provide convenient means for withdrawing the tool and the thrust resisting members from the work piece after the cutting has been completed so that the tool can be retracted without leaving tool marks on the work piece and so that the new work piece can be readily placed in the machine with provision for quickly repositioning of the tool and the thrust resisting member for the next cutting operation.

The invention aims also to provide an adjustable stop member which limits the outward movement of the tool and thrust resisting members to an amount proportional to the angle of the taper cut.

A still further object is to provide an improved form of cam of a built-up nature and composed of relatively adjustable cam members which are admirably adapted for work pieces having various tapers, sizes and lengths of surfaces to be turned which may be tapered to different degrees or which may be in part tapered and in part straight.

The above and other objects are attained by my invention which may be hereinafter briefly summarized as consisting in certain novel details of construction, and combinations and arrangements of parts which will be described in the specification and set forth in the appended claims.

In the accompanying sheets of drawings wherein I have shown the preferred embodiment of my invention:

Fig. 1 is a side elevation of the principal portions of the machine tool, here shown as a hexagon turret lathe, equipped with my improved taper turning attachment;

Fig. 2 is an enlarged detached face view of the tool carrying part of the attachment and showing the cam in section.

Fig. 3 is a side elevation of the same;

Fig. 4 is a sectional view substantially along the line 4—4 of Fig. 3;

Fig. 5 is a vertical sectional view substantially along the line 5—5 of Fig. 2;

Fig. 5ª is a vertical sectional view substantially along the line 5ª—5ª of Fig. 3;

Fig. 6 is a plan view of a portion of that part of the attachment shown in Fig. 2 illustrating particularly the lever for moving the tool and thrust resisting members radially with respect to the axis of the work piece;

Fig. 7 is a detail view illustrating an adjustable stop member associated with the lever shown in Figs. 2 and 6;

Fig. 8 is a sectional view substantially along the line 8—8 of Fig. 2;

Fig. 9 is a sectional view substantially along the line 9—9 of Fig. 2;

Fig. 10 is an enlarged plan view of the cam holding part showing also a portion of the cam;

Fig. 11 is a side elevation of the same with a portion of the cam illustrated by full lines in normal or cutting position and by dotted lines in inoperative position;

Fig. 12 is an end view of the cam holding part with the cam itself in section;

Fig. 13 illustrates a special form of work piece requiring a cam having cam portions of different degrees of taper;

Fig. 14 is a side elevation of a built-up cam having relatively adjustable cam members adaptable for a work piece such as illustrated in Fig. 13;

Fig. 15 is a side elevation of the body of the cam such as illustrated in Fig. 14;

Fig. 16 is a detached view of one of the adjustable cam members which may be applied to the body of Fig. 15 in a manner such as illustrated in Fig. 14;

Fig. 17 is a transverse sectional view substantially along the line 17—17 of Fig. 14;

Fig. 18 is a similar sectional view substantially along the line 18—18 of Fig. 14.

Referring now to the drawings, 20 represents the bed of a lathe which is provided with a head 21 having a suitably driven spindle (not shown) which in this instance carries a work holding member in the form of a chuck 22 adapted to support the work piece 23. On the head 21 is adapted to be supported the cam member of the attachment which is generally a tapered bar 24 which, however, at its top surface has a shape or configuration corresponding to that which is to be given to the work piece 23. In Fig. 1 the cam is provided with a straight taper and the work piece 23 is similarly tapered, the taper of the work piece being the reverse of that on the cam. The cam may be supported at its inner end in various ways but preferably in the manner illustrated in Figs. 10, 11 and 12. As illustrated therein the inner end of the cam is pivoted by means of a screw or bolt 25 between the ears of a bracket 26 adjustably connected to a bar 27 which is secured to a suitably machined pad on the head 21 by means of bolts 28. In order that the cam may be adapted for work pieces of different lengths, the bracket is adjustable lengthwise of the bar 27, and accordingly the bar is provided with an elongated slot 29 and the bracket is secured to the bar by a horizontal bolt 30 extending through the slot 29, the bolt being provided in this instance at one end with a nut in the form of a shoe 31, (see Figs. 10 and 12) slidingly engaging in a groove 32 formed on the rear side of the bar. See Fig. 12. Two top screws 33 are employed also to assist bolt 30 in securing the bracket in any adjusted position to the bar. The two screws 33 are in the form of set screws which extend through the top portion of the bracket and bear against the top surface of the bar. This makes it possible by loosening one screw and tightening the other to rock the bracket on the bar about the axis of bolt 30 so as to raise or lower the cam to cause it to properly engage the supporting member to be referred to later and particularly to bring the lower side of the bar into parallelism with the axis of the machine.

Normally the cam extends horizontally as illustrated in Fig. 1 in which event the rear end of the cam engages an abutment 34 illustrated in Fig. 11, but with the type of support illustrated the bar may be swung upwardly slightly beyond vertical position as illustrated by dotted lines in Fig. 11 in which event what is normally the top surface of the bar will engage an abutment 35 also illustrated in Fig. 11.

The lathe is provided in this instance with a turret 36 which is adapted to be moved back and forth along the ways of the bed 20 and is adapted to carry the unit having the cutting tool and associated parts and the follower which cooperates with the cam 24.

These parts referred to are carried on a bracket or tool holding body 37 which is adapted to be secured to any face of the turret by the usual means. The bracket has a circular bore 38 (see Fig. 2) into which the work piece is adapted to project on the forward or working stroke of the turret.

On the front face of the bracket are supported three cooperating parts which include the cutting tool 39, and two thrust resisting rollers 40 and 41 which are adapted to engage the work piece during the cutting operation in the well known manner. The cutting tool 39 is carried by a tool slide 42 which slidingly engages a horizontally disposed way 43 best shown in Fig. 3. The rollers 40 and 41 are carried respectively by two levers 44 and 45 which are supported on the bracket 37 by means of two bearing pins 46 and 47, as illustrated in Figs. 8 and 9. Preferably the levers are pressed onto the outer end of the bearing pins which extend through and have a bearing in the bracket 37, the openings which receive the pins being accurately machined so that those portions of the bearing openings which receive the thrust are at right angles to the front face of the bracket against which the levers bear, as illustrated in Figs. 8 and 9.

The upper rear part of the bracket is provided with an opening 48 which receives the cam 24 shown in section in Fig. 2. Additionally, the rear part of the bracket is provided with a vertical forwardly facing groove 49 in which is arranged for vertical sliding movement a follower 50 which, in this instance, is composed of three parts consisting of an upper part $50^a$, an intermediate part $50^b$ and a lower part $50^c$, the upper part of the groove being closed by a plate 51 which holds the upper part $50^a$ of the follower in place, the lower part of the plate extending inwardly and forming a portion of the sliding surface which receives the lower face of the cam, as illustrated in Figs. 2 and 3.

The upper member $50^a$ of the follower is provided with a laterally projecting portion 52 which overhangs the cam when it is engaged in the opening 48 provided for that purpose in the bracket. The lower edge of this projecting portion is preferably V-shaped so that the follower will have a line contact with the top face of the cam, as best illustrated in Figs. 3 and 5ª.

The upper and intermediate members of the follower are adjustably connected together and in this instance, the upper member 50ª has a bore which extends up from the bottom and receives with a sliding fit a tubular portion 53 of the intermediate follower member 50ᵇ. An adjusting screw 54 extends through the top of the upper follower member 50ª and has threaded engagement with an opening formed in the tubular portion 53 of the intermediate follower member. There is secured to the top of the screw 54 a dial 55 which preferably is graduated, and co-operating with this dial is an indicator 56, shown in Figs. 2 and 3, this dial and indicator permitting just the desired adjustment to be imparted to the two lower follower members by turning the screw 54. The upper part of the dial is in the form of a square head 57 which is adapted to receive a lever 58 by which the screw 54 may be turned to raise or lower the two lower follower members 50ᵇ and 50ᶜ.

It will be noted that the rear part of the lever has a down-turned extension 58ª which is adapted to co-operate with a stop screw to be referred to later. The lever 58 is removable from the square head of the dial and while the adjustments are being given to the two lower follower members, as in making a set-up the lever is reversed in position so that the normal downward extension projects upwardly so as to be clear of the stop screw and permit free movement of the lever to any extent and in either direction.

Not only can the two lower follower members last referred to be raised and lowered simultaneously by turning the screw 54 but they are relatively adjustable, and to this end they are connected by a nut 59 having right and left hand threaded portions which receive threaded extensions 60 and 61 on the adjacent ends of the two follower members 50ᵇ and 50ᶜ. The bracket is cut away, as shown at 62, in the vicinity of this nut so that a turning wrench can be readily applied to it. By turning the nut in one direction or the other these two follower members are moved toward or away from each other and when they have been adjusted to the desired positions relative to each other a lock nut 63 is tightened to hold these parts in their adjusted positions.

Vertical movement given to the follower rocks the levers 44 and 45 and imparts a sliding movement to the tool slide 42, and to bring this about the intermediate follower member 50ᵇ is provided with a forwardly projecting pin 64 carrying a shoe 65 which slidingly engages in a slot formed on the inner side of the rear portion of the lever 44. See Figs. 5 and 8. Similarly the lower follower member 50ᶜ has a lateral projecting pin 66 provided with a shoe 67 engaging a slot on the inner side of the rear portion of lever 45. Additionally, the lower portion of lever 45 is connected to the tool slide 42 by a link 68 which is connected to the lever and slide by pins 69.

It is desired not only that the rollers 40 and 41 and the tool 39 be simultaneously moved toward or away from the work piece, but that the extent of the movements be identical within the limits of the extreme accuracy required for a tool of this kind, and, accordingly, the distance between the center of the bearing pin 46 and the center of pin 40ª is made identical to the distance between the center of pin 41ª and the center of bearing pin 47 as well as with the distance between the center of bearing pin 47 and the center of pin 69 connecting link 68 to lever 45. Additionally, the distance from the center of bearing pin 46 to the center of pin 64 (which connects the lever 44 to the intermediate follower member 50ᵇ) is identical with the distance between the center of bearing pin 47 and the center of pin 66 (connecting lever 45 to the lower follower member 50ᶜ).

Obviously, when the follower is raised the rollers 40 and 41 and tool 39 are simultaneously moved in toward the work piece equal amounts, and when the follower is lowered they are simultaneously moved away from the work piece equal amounts.

The adjustability of the two lower follower members with respect to the upper follower member and the adjustability of the two lower follower members with respect to each other is of considerable importance particularly when an original set-up is being made for a work piece or for a series of similar work pieces. Assuming that a set-up is being made and that the tool holding bracket is attached to the turret, that the supporting bracket 26 of the cam is properly positioned on the bar 27, and that the portion 52 of the follower is engaging the cam, a light preliminary cut is made on the work piece so as to obtain an accurately turned portion on the stock the length of which need not be any greater than the width of the rollers. When this preliminary cut is made for setting-up purposes, the rollers 40 and 41 are not in contact with the work piece. Then the tool 39 may be removed from this tool slide, but is preferably moved back by turning the tool adjusting screws 70, three of which are provided, two extending through the tool slide opposite each other and a third which is rearwardly of the other two with respect to the length of the tool, being arranged opposite an abutment 71 against which the inner rear portion of the tool bears. Then by turning the lever 58 which lowers the follower members 50ᵇ and 50ᶜ with respect to the upper follower member 50ᵃ, the upper roller 40 is brought down so that it will just engage the turned portion of the work piece. Then the adjusting nut 59 is turned so as to move the rear roller 41 to a position such that it similarly engages the turned portion of the work piece, after which it is locked in position by the lock nut 63. Then the cutter is adjusted by the screws 70 until the cutting point thereof also engages the turned portion of the work piece directly opposite the center thereof. As illustrated in Fig. 3, the cutting point of the cutter is slightly in advance of the rollers 40 and 41 so that in operation these rollers will bear against a turned portion of the work piece instead of against a rough or unturned portion.

After the two rollers 40 and 41 and the cutter have been adjusted in the manner just stated by turning the lever 58 the two rollers and cutter are adjusted to a position corresponding to the minimum diameter of the work piece where the cutting is supposed to start. Then generally a trial cut is taken, and, if need be, a further adjustment of the two rollers and cutting tool can be made by turning the lever 58, the parts being brought very accurately to the desired position by means of the dial 55. When this position is found a stop screw 72 (see particularly Fig. 6) is adjusted so as to bring the inner end thereof up against the down-turned portion 58ᵃ of the lever 58, this stop screw being carried by a plate 74 which is attached to the rear upper part of the bracket 37, as clearly illustrated in Figs. 2 and 6. Then the screw is locked in position, and in the embodiment shown this is done by tightening a small lock screw 75 which is adapted to squeeze together the two parts of a slotted extension 76 of plate 74, through which extension the stop screw 72 extends.

The cut is now taken along the work piece and as the upper member of the follower travels down the tapered upper face of the cam, the cutter and the thrust resisting rollers 40 and 41 gradually move outwardly so as to impart to the work piece the same taper possessed by the top surface of the cam. It is to be noted in passing that the reaction of the work on the cutter and the thrust of the work on the rollers 40 and 41 all tend to move the follower downwardly and therefore to hold the upper bearing part of the follower down onto the tapered top surface of the cam. Inasmuch as the thrust of all these parts is in effect in the same direction in so far as their effect on the follower is concerned, no one part is working against another so that the effect of back-lash is entirely eliminated resulting in a smooth action and a true tapered surface being imparted to the work piece.

When the cut is completed, the operator turns the lever 58 so as to lower the two lower members of the follower and, thereby, move the cutter and thrust resisting rollers 70 away from the work piece. The turret is then retracted without the liability of the work piece being marred by the cutter, and assuming that one cut only need be made on the work piece, it is removed and a new work piece supplied, whereupon the operator simply moves the lever 58 until the downward extension 58ᵃ again engages the end of the stop screw 72, whereupon the cutting tool and thrust resisting rollers are restored to their previous positions in proper relationship to each other and to the work piece and the taper cutting operation can then be repeated.

I prefer to supplement the reactive thrust of the work piece on the cutter and rollers to hold the parts in their proper position with relationship to the follower and of the follower in proper relationship to the cam both while a cut is being taken and while no cut is being taken, as when the turret and tool are being retracted, by means of a spring which may be carried by the bracket 37 so as to at all times act on the tool slide. Such a spring is shown in Fig. 4 at 77, the spring being located in a suitable bored opening formed in the bracket 37 alongside the tool slide and bearing against a pin or other suitable abutment 78 seated in the outer portion of the slide so that the tension of the spring has a tendency to move the slide outwardly away from the work piece or in the same direction that the thrust of the work piece on the cutter tends to move the slide.

When the turret is retracted it is moved back far enough so that the bracket 37 and follower are free of the cam 24 so that the turret can be indexed if it is desired that other tools be brought into cutting position, in which event the cam bar may be swung up to its inoperative position shown by dotted lines in Fig. 11. It will be noted that the rear or free end of the cam bar is provided with a short but rather steep reverse taper and the follower rides down this taper just before the bracket clears the cam while the turret is being retracted. As the follower rides down this reverse tapered portion of the cam the spring 77 tends to move the cutter and rollers away from the work piece to the maximum permissible distance, but it is not desirable that they move outwardly any amount materially greater than necessary to clear the free end of the work piece and accordingly, means is provided for limiting the action of spring 77 in so far as the effect to move these parts outwardly is concerned. This consists of a stop screw 79 which extends through pin 78 and centrally through spring 77 into the threaded opening of a bushing 80 which is screwed into the bracket at the base of the opening which receives the spring. The head of screw 79 forms a stop for the pin 78 and, therefore, for the tool slide so that the outward movement of the slide under the action of spring 77 is arrested thereby preventing the outward movement of the cutter and rollers beyond the predetermined position. The screw can be adjusted to vary the distance that the tool slide may be moved by spring 77.

The cam 24, heretofore described, is adapted for work pieces having a uniform taper, but as previously stated in some work pieces the taper may vary at different points. It may be actually reversed or it may be straight in part. For example, in Fig. 13 I have shown a work piece 81 having tapered portions 81$^a$ and 81$^b$ of different degrees of taper and a straight portion 81$^c$. In turning a work piece of this kind a one-piece cam may be utilized with a working surface adapted to be engaged by the follower corresponding in contour to the outline of the surface of the work piece. On the other hand the proper tapers and straight portion can be imparted by a cam composed of several parts adjustable to different tapers and lengths, and in Figs. 14 to 18 inclusive, I have shown a cam of this character. This cam is composed of a cam body 82 which, in this instance, is substantially L-shaped in cross section between its ends. To the L-shaped portion are secured a plurality of cam members in this case three in number (but the number may be varied) and here designated 83, 84 and 85. These cam members are adapted to be secured to an upright face of the L-shaped portion of the cam body 82 by laterally disposed screws 86 which extend through elongated slots 87 provided in the cam members. The lower edges of these cam members engage adjustable set screws 88 which extend upwardly through the laterally flanged portion of the cam body. It will be observed that the downward thrust of the follower on the cam members thus supported is taken by the set screws 88, the chief function of the laterally disposed screws 86 being to hold the engaging vertical faces of the cam body and cam members in tight frictional contact with each other.

Thus it will be seen that with a cam composed of a cam body and cam members arranged and supported as illustrated, any cam member can be adjusted angularly to provide any desired degree of taper or to provide a straight portion on the cam. Additionally, it will be observed that the upright portion of the cam body is provided at intervals along its length with a series of tapped holes 89 to accommodate the laterally disposed screw 86, thus making it possible to secure to the cam body cam members of different lengths and thereby adapt the cam member to work pieces of different lengths as well as shapes.

While I have illustrated the preferred construction of the tool holding part of the attachment and one modification only in the form of the cam portion of the attachment, I do not desire to be confined to the details of arrangement or construction illustrated, but aim in my claims to cover all modifications which do not involve a departure from the spirit and scope of my invention.

Having thus described my invention, I claim:

1. A taper turning attachment for machine tools having two relatively movable members, said attachment comprising a cam adapted to be applied to one of said members and a unit adapted to be applied to the other and comprising a body having a follower engageable with the cam, a cutter holder, and two thrust resisting members having separate pivoted supports with independent connections with the follower.

2. A taper turning attachment for machine tools having two relatively movable members, said attachment comprising a cam adapted to be applied to one of said members and a unit adapted to be applied to the other, said unit comprising a body provided with a follower composed of a plurality of relatively adjustable parts, a cutter holder, and two thrust resisting members connected separately to two of said parts of the follower, the cutter holder being connected to one of said thrust resisting members.

3. A taper turning attachment for machine tools having two relatively movable members, said attachment comprising a cam adapted to be positioned on one of said members and a unit adapted to be positioned on the other, said unit comprising a supporting body provided with a follower adapted to engage the cam, and provided also with two thrust resisting members having independent pivoted supports and with a cutter holder in the form of a slide, the follower, the thrust resisting members and the slide being interconnected so as to move simultaneously.

4. A taper turning attachment for machine tools having two relatively movable members, said attachment comprising a cam adapted to be secured to one of said members and a unit adapted to be secured to the other, said unit comprising a body carrying a cutter holder and thrust resisting means engageable with the work piece, said body further being provided with a guide way, a follower in said guide way composed of three relatively adjustable parts, one adapted to engage the cam and the other two serving to transmit movement to the thrust resisting means and cutter holder.

5. A taper turning attachment for machine tools having two relatively movable members, a cam adapted to be applied to one of said members and a unit adapted to be applied to the other, said unit comprising a body having three movable members, one in the form of a tool holder and the other two in the form of thrust resisting members and said unit further having a follower with a portion engageable with the cam and with two portions separately connected with the thrust resisting members, one of said thrust resisting members being connected to the cutter holder.

6. A taper turning attachment for machine tools having two relatively movable members, a cam adapted to be applied to one of said members and a unit adapted to be applied to the other, said unit comprising a body having three movable members, one in the form of a tool holder and the other two in the form of thrust resisting members and said unit further having a follower with a portion engageable with the cam and with two portions separately connected to the thrust resisting members, one of said thrust resisting members connected to the cutter holder, and means for moving the portions of the follower connected to the thrust resisting members relative to the portion thereof which is engageable with the cam.

7. A taper turning attachment for machine tools having two relatively movable members, said attachment comprising a cam adapted to be applied to one of said members and a unit adapted to be applied to the other, said unit comprising a body carrying a tool holder in the form of a slide, two pivoted levers having thrust resisting rollers and a follower having a portion engageable with the cam and two portions separately connected to said levers, one of the levers being connected to said slide.

8. A taper turning attachment for machine tools having two relatively movable members, said attachment comprising a cam adapted to be applied to one of said members and a unit adapted to be applied to the other, said unit comprising a body carrying a tool holder in the form of a slide, two pivoted levers having thrust resisting rollers and a follower having a portion engageable with the cam and two portions separately connected to said levers, one of the levers being connected to said slide, and means for shifting the portions of the follower connected to the levers relative to the portion which is engageable with the cam.

9. A taper turning attachment for machine tools having two relatively movable members, said attachment comprising a cam adapted to be applied to one of said members and a unit adapted to be applied to the other, said unit comprising a body carrying a tool holder in the form of a slide, two pivoted levers having thrust resisting rollers and a follower having a portion engageable with the cam and two portions separately connected to said levers, one of the levers being connected to said slide and means whereby the two portions connected to the levers may be adjusted relative to each other.

10. A taper turning attachment for machine tools having two relatively movable members, said attachment comprising a cam adapted to be applied to one of said members and a unit adapted to be applied to the other, said unit comprising a body having a cutter holder, thrust resisting means and a follower composed of two portions one engageable with the cam and the other operatively connected to the thrust resisting means and to the cutter holder, an adjusting member for shifting the last mentioned portion of the follower with respect to the first named and serving when moved in one direction to shift the thrust resisting means and the tool holder away from the work piece, and when shifted in the opposite direction bringing the thrust engaging means and the cutter of the cutter holder in operative position with respect to the work piece, and a stop for positioning said adjusting member with the thrust resisting means and the cutter in the last mentioned position.

11. A taper turning attachment for machine tools having two relatively movable members, said attachment comprising a cam and a supporting bracket adapted to be applied to one of said members, and a unit comprising a support having a follower, a cutter holder and thrust resisting means adapted to be applied to the other member, said cam adapted to be pivotally mounted on said bracket so that it can be swung to and from operative position and the bracket having an abutment for engagement by the cam.

12. A taper turning attachment for machine tools having two relatively movable members, said attachment comprising a cam adapted to be applied to one of said members and a unit adapted to be applied to the other, said unit comprising a body having a cutter holder, thrust resisting means and a follower composed of two portions one engageable with the cam and the other operatively connected to the trust resisting means and to the cutter holder, an adjusting member for shifting the last mentioned portion of the follower with respect to the first named and serving when moved in one direction to shift the thrust resisting means and the cutter holder away from the work piece, and when shifted in the opposite direction bringing the thrust engaging means and the cutter holder in operative position with respect to the work piece and an adjustable stop for positioning said adjusting member with the thrust resisting means and cutter holder in the last mentioned position.

13. A taper turning attachment for machine tools having two relatively movable members, said attachment comprising a cam adapted to be applied to one of said members and a unit adapted to be applied to the other, said unit comprising a body having a cutter holder, thrust resisting means and a follower composed of two portions one engageable with the cam and the other operatively connected to the thrust resisting means and to the cutter holder, an adjusting member for shifting the last mentioned portion of the follower with respect to the first named and serving when moved in one direction to shift the thrust resisting means and the cutter holder away from the work piece, and when shifted in the opposite direction bringing the same in operative position with respect to the work piece, and a stop for positioning said adjusting member with the thrust resisting means and cutter holder in the last mentioned position, said adjusting member being reversible whereby it may be turned without engaging the stop.

14. A taper turning attachment for machine tools having two relatively movable members, said attachment comprising a cam and a supporting bracket adapted to be applied to one of said members and a unit adapted to be applied to the other, and comprising a body having a follower engageable with the cam and having also a cutter holder and thrust resisting means both movable with the follower, means for adjusting the bracket to bring the cam into parallelism with the axis of the machine tool.

15. A taper turning attachment for machine tools having two relatively movable members, said attachment comprising a cam adapted to be applied to one of said members and a unit adapted to be applied to the other, and comprising a body having a follower engageable with the cam and having also a cutter holder and thrust resisting means both movable with the follower, said cam having a mounting comprising two parts, one adapted to be attached to said member of the machine tool and the other adjustably connected to the first named part and carrying the cam, the adjustment permitting the raising and lowering of the cam to bring the same into parallelism with the center line of the machine.

16. A taper turning attachment for machine tools having two relatively movable members, said attachment comprising a cam adapted to be applied to one of said members and a unit adapted to be applied to the other, and comprising a body having a follower engageable with the cam and having also a cutter holder and thrust resisting means both movable with the follower, said cam having a mounting comprising a part adapted to be fixed to said member and a second part adjustably secured to the first named part, the second mentioned part carrying the cam which is pivoted thereto whereby it may be swung to and from operative position.

17. A taper turning attachment for machine tools having two relatively movable members, said attachment comprising a cam adapted to be applied to one of said members and a unit adapted to be applied to the other and comprising a body provided with a cutter holder, thrust resisting means and a follower for shifting the same and adapted to engage the cam, said cam being composed of a body and an adjustable follower-engaging part composed of adjustable members by which the taper of one part may be adjusted with reference to the taper of another part.

18. A taper turning attachment for machine tools having two relatively movable members, said attachment comprising a cam adapted to be applied to one of said members and a unit adapted to be applied to the other and comprising a body provided with a cutter holder, thrust resisting means and follower for shifting the same and adapted to engage the cam, said cam comprising a body portion and a plurality of removable and adjustable follower-engaging members.

19. A taper turning attachment for machine tools comprising a cam adapted to be applied to one member of the tool and a unit adapted to be applied to another and comprising a body having a follower, a cutter holder and thrust resisting means connected to the follower, the follower being provided with a cam engaging portion which is adjustable with reference to the rest of the follower.

20. A taper turning attachment for machine tools comprising a cam adapted to be applied to one member of the tool and a unit adapted to be applied to another member thereof, the unit comprising a body having a follower, a cutter holder and two thrust resisting members having separate connections with the follower, the latter having a cam engaging portion adjustable with reference to the portions connected to the thrust resisting members.

21. A taper turning attachment for machine tools comprising a cam adapted to be applied to one of the members of the tool and a unit adapted to be applied to another, the unit comprising a body provided with a follower, a cutter holder and two thrust resisting members operatively connected to the follower, the follower being composed of relatively adjustable parts to which the thrust resisting members are separately connected.

22. A taper turning attachment for machine tools comprising a cam adapted to be applied to one member of a tool and a unit adapted to be applied to another, the unit comprising a body carrying the follower and holders for a cutting tool and for thrust resisting means, the follower being composed of a plurality of relatively adjustable parts including a part engageable with the cam and two parts to which said holders are attached.

In testimony whereof, I hereunto affix my signature.

JOHN J. N. VAN HAMERSVELD.